US012603080B2

(12) United States Patent
Lee et al.

(10) Patent No.: US 12,603,080 B2
(45) Date of Patent: Apr. 14, 2026

(54) AUGMENTED REALITY LANGUAGE TRANSLATION METHOD AND SYSTEM USING A SITUATION-WORD DATABASE

(71) Applicant: ELECTRONICS AND TELECOMMUNICATIONS RESEARCH INSTITUTE, Daejeon (KR)

(72) Inventors: Min kyu Lee, Daejeon (KR); Sanghun Kim, Daejeon (KR); Seung Yun, Daejeon (KR); Jeonguk Bang, Daejeon (KR); Namhyeong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 288 days.

(21) Appl. No.: 18/319,946

(22) Filed: May 18, 2023

(65) Prior Publication Data

US 2023/0377558 A1      Nov. 23, 2023

(30) Foreign Application Priority Data

May 23, 2022     (KR) ........................ 10-2022-0062775

(51) Int. Cl.
*G10L 13/027*        (2013.01)
*G06F 40/58*         (2020.01)
(Continued)

(52) U.S. Cl.
CPC ............ *G10L 13/027* (2013.01); *G06F 40/58* (2020.01); *G06V 40/161* (2022.01); *G10L 15/005* (2013.01)

(58) Field of Classification Search
USPC .................................................. 704/2; 345/8
See application file for complete search history.

(56) References Cited

U.S. PATENT DOCUMENTS

| | | | | |
|---|---|---|---|---|
| 8,566,075 B1 * | 10/2013 | Bruner | ............... | H04N 21/6582 |
| | | | | 704/2 |
| 9,897,808 B2 | 2/2018 | Yoo | | |

(Continued)

FOREIGN PATENT DOCUMENTS

| | | |
|---|---|---|
| KR | 20100126004 A | 12/2010 |
| KR | 20140093459 A | 7/2014 |

(Continued)

*Primary Examiner* — Farzad Kazeminezhad
(74) *Attorney, Agent, or Firm* — Rabin & Berdo, P.C.

(57) ABSTRACT

The present invention relates to an automatic interpretation method and system for converting only voice of a speaker into a target language. The present invention may significantly improve performance of automatic interpretation with a foreigner to be communicated with, even in a high-noise environment in which multiple speakers utter at the same time by utilizing voice and image information input to a smart device in a complex manner. In addition, the present invention may determine a situation based on text information and image information existing around a user, and reflect the situation information together with multimodal information to an interpretation engine in real time. In addition, the present invention may significantly improve user convenience of an automatic interpretation system by directly augmenting and displaying an interpreted sentence directly next to a speaker image or generating a synthesized sound by distinguishing the interpreted sentence from other speeches.

17 Claims, 12 Drawing Sheets

(51) Int. Cl.
　　*G06V 40/16*　　　(2022.01)
　　*G10L 15/00*　　　(2013.01)
　　*G10L 17/06*　　　(2013.01)

(56) References Cited

U.S. PATENT DOCUMENTS

| | | | |
|---|---|---|---|
| 10,275,023 B2 | 4/2019 | McKenzie et al. | |
| 11,056,103 B2 | 7/2021 | Kim et al. | |
| 2013/0289971 A1* | 10/2013 | Parkinson | G06F 40/58 |
| | | | 704/2 |
| 2014/0129207 A1* | 5/2014 | Bailey | G06F 40/58 |
| | | | 704/2 |
| 2020/0159822 A1 | 5/2020 | Roh et al. | |
| 2023/0122450 A1* | 4/2023 | Olwal | G10L 17/06 |
| | | | 345/8 |

FOREIGN PATENT DOCUMENTS

| | | |
|---|---|---|
| KR | 10-2016-0138837 A | 12/2016 |
| KR | 20190071405 A | 6/2019 |
| KR | 20200144521 A | 12/2020 |
| KR | 10-2313272 B1 | 10/2021 |

* cited by examiner

FIG. 3

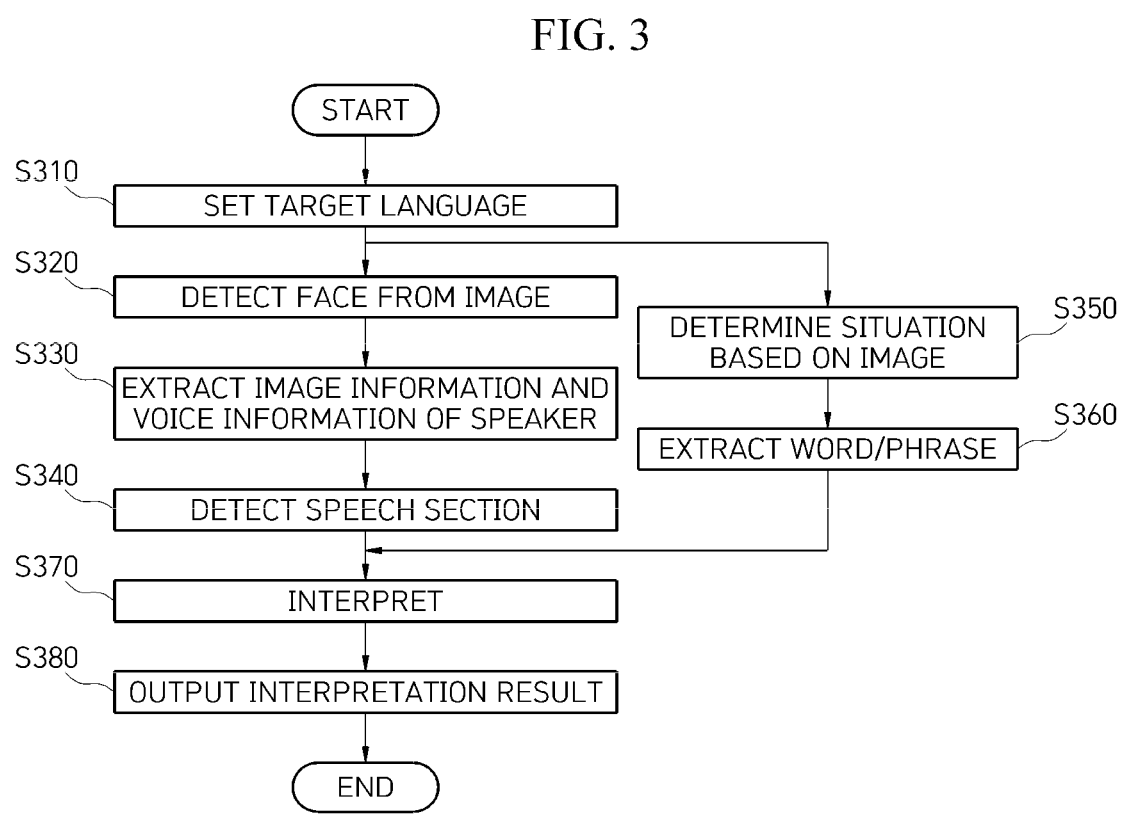

START

S310 — SET TARGET LANGUAGE

S320 — DETECT FACE FROM IMAGE

S350 — DETERMINE SITUATION BASED ON IMAGE

S330 — EXTRACT IMAGE INFORMATION AND VOICE INFORMATION OF SPEAKER

S360 — EXTRACT WORD/PHRASE

S340 — DETECT SPEECH SECTION

S370 — INTERPRET

S380 — OUTPUT INTERPRETATION RESULT

END

AUGMENTED REALITY LANGUAGE TRANSLATION METHOD AND SYSTEM USING A SITUATION-WORD DATABASE

CROSS-REFERENCE TO RELATED APPLICATION

This application claims priority to and the benefit of Korean Patent Application No. 10-2022-0062775, filed on May 23, 2022, the disclosure of which is incorporated herein by reference in its entirety.

BACKGROUND

1. Field

The present invention relates to an augmented automatic interpretation method and system based on a user's viewing range, that is, a user's visual field. Specifically, the present invention relates to an automatic interpretation method and system capable of improving automatic interpretation performance by utilizing multimodal information existing in a user's visual field to transmit augmented automatic interpretation results to a user.

2. Description of Related Art

With the development of artificial intelligence technology, an automatic interpretation technology is spreading widely. In particular, in recent years, as end-to-end speech recognition and automatic interpretation technologies trained using a neural network with voice signals as inputs and using translated strings as outputs, automatic interpretation performance has improved significantly compared to the past.

However, there are many difficulties in the process of using automatic interpretation technologies. Among these technologies, it is a very difficult technology to exclude noise and select only voice to be interpreted. In a real environment, various types of environmental noise and voice noise exist simultaneously. This is a major factor in degrading the performance of speech recognition and automatic interpretation. To solve this problem, technologies that force a voice section using a button on a smartphone or automatically detect only the voice section using voice information are being used. However, using the button on the smartphone causes inconvenience to a user, and voice section detection using only the voice information has limitations in its performance.

In addition, it is very useful to quickly provide a user with an interpretation result for voice of a speaker in a situation where interpretation is required, but it is difficult to implement it because it is difficult to predict a situation in which interpretation is required in a real environment.

SUMMARY

The present invention provides a gaze-based and augmented automatic interpretation method and system capable of converting voices of multiple speakers and generating voice implemented in a user's desired language by simultaneously utilizing image information and voice information, and displaying sentences implemented in a user's native language on a speaker's image within a user's visual field or outputting the converted voice, in order to support users to immediately and easily grasp the surrounding situation in situations where automatic interpretation is required, An aspect of the present invention is not limited to the above-described aspect. That is, other aspects that are not described may be obviously understood by those skilled in the art from the following specification.

In an aspect of the present invention, a gaze-based and augmented automatic interpretation method includes: collecting image information and voice information within a user's visual field, and detecting a face region of a speaker from the collected image information; selecting at least one speaker to be interpreted based on the detected face region and individually extracting voice information of the speaker from the collected voice information; and generating an interpretation result according to a predetermined target language based on the voice information of the speaker.

The gaze-based and augmented automatic interpretation method may further include adding the interpretation result to the collected image information and displaying the collected image information on a screen of a terminal of the user. In the displaying on the terminal screen, a position to which the interpretation result is added on the collected image information may be determined based on the detected face region.

The gaze-based and augmented automatic interpretation method may further include: detecting a speech section from the voice information of the speaker to extract voice information of a speech section of the speaker. In the generating of the interpretation result, the interpretation result may be generated by using a speech recognition model and a machine translation model based on the voice information of the speech section.

The extracting of the voice information of the speaker may further include extracting image information of the speaker from the collected image information based on the detected face region. In the generating of the interpretation result, the interpretation result may be generated based on the voice information of the speaker and the image information of the speaker.

The extracting of the voice information of the speaker may further include extracting the image information of the speaker from the collected image information based on the detected face region. In the extracting of the voice information of the speech section, the voice information of the speech section of the speaker may be extracted by detecting the speech section from the voice information of the speaker based on the image information of the speaker.

In the extracting of the voice information of the speaker, registered voice information of the speaker may be extracted from a user information database based on image information corresponding to the detected face region, and the voice information of the speaker may be extracted from the collected voice information by utilizing the registered voice information.

The gaze-based and augmented automatic interpretation method may further include inferring a situation based on the collected image information. In the generating of the interpretation result, the interpretation result may be generated according to the target language based on the situation and the voice information of the speaker.

The inferring of the situation may further include extracting a word related to the situation from a situation-word database based on the situation. In the generating of the interpretation result, the interpretation result may be generated according to the target language based on a word related to the situation and the voice information of the speaker.

The gaze-based and augmented automatic interpretation method may further include recognizing text included in the collected image information. In the generating of the interpretation result, the interpretation result may be generated according to the target language based on the text and the voice information of the speaker.

In another aspect of the present invention, an interpretation server includes: an analysis module that receives image information and voice information in a user's visual field from a user terminal, selects at least one speaker to be interpreted based on a face region detected in the received image information, and individually extracts the voice information of the speaker from the received voice information; and an interpretation module that generates an interpretation result according to a preset target language based on the voice information of the speaker and transmitting the generated interpretation result to the terminal.

The interpretation server may further include a user information management module that extracts registered voice information of the speaker to be interpreted from a user information database based on an image corresponding to the face region detected in the received image information. The analysis module may individually extract the voice information of the speaker based on the received voice information and the registered voice information.

The interpretation server may further include a user information management module that extracts registered voice information of the speaker to be interpreted from a user information database based on an image corresponding to the face region detected in the received image information. The interpretation module may generate a synthesized sound matching a tone of the speaker based on the registered voice information and the interpretation result, and transmit the generated synthesized sound to the terminal.

The analysis module may detect a speech section from the voice information of the speaker and extract speech section voice information of the speaker. The interpretation module may generate the interpretation result by using a speech recognition model and a machine translation model based on the speech section voice information.

The analysis module may extract the image information of speaker from the received image information based on the detected face region, and the interpretation module may generate the interpretation result based on the voice information of the speaker and the image information of the speaker.

The analysis module may infer a situation based on the received image information, and the interpretation module may generate the interpretation result based on the situation and the voice information of the speaker.

In another aspect of the present invention, a terminal includes: an input module that collects image information and voice information of a user's visual field; an analysis module that detects a face region of a speaker in the collected image information, selects at least one speaker to be interpreted based on the detected face region, and individually extracts the voice information of the speaker from the collected voice information and transmits the extracted voice information to an interpretation server; and an output module that receives an interpretation result for the voice information of the speaker from the interpretation server and outputs the interpretation result through at least one of a display and a sound output unit (for example, speaker).

The terminal may be a smart glass worn by a user.

The analysis module may extract the image information of speaker from the collected image information based on the detected face region and transmit the extracted image information to the interpretation server.

The analysis module may transmit the image of the face region detected in the collected image information to the interpretation server, receive registered voice information of a speaker matching the image of the detected face region from the interpretation server, and use the registered voice information to extract the voice information of the speaker from the collected voice information.

The analysis module may infer a situation based on the collected image information, and transmit the inferred situation to the interpretation server.

BRIEF DESCRIPTION OF DRAWINGS

FIG. 3 is a flowchart for describing the gaze-based and augmented automatic interpretation method according to the embodiment of the present invention.

FIG. 5 is a reference diagram illustrating an automatic interpretation process according to an embodiment of the present invention.

FIG. 12 is a block diagram illustrating a computer system for implementing the method according to the embodiment of the present invention.

DETAILED DESCRIPTION

Figure 1:
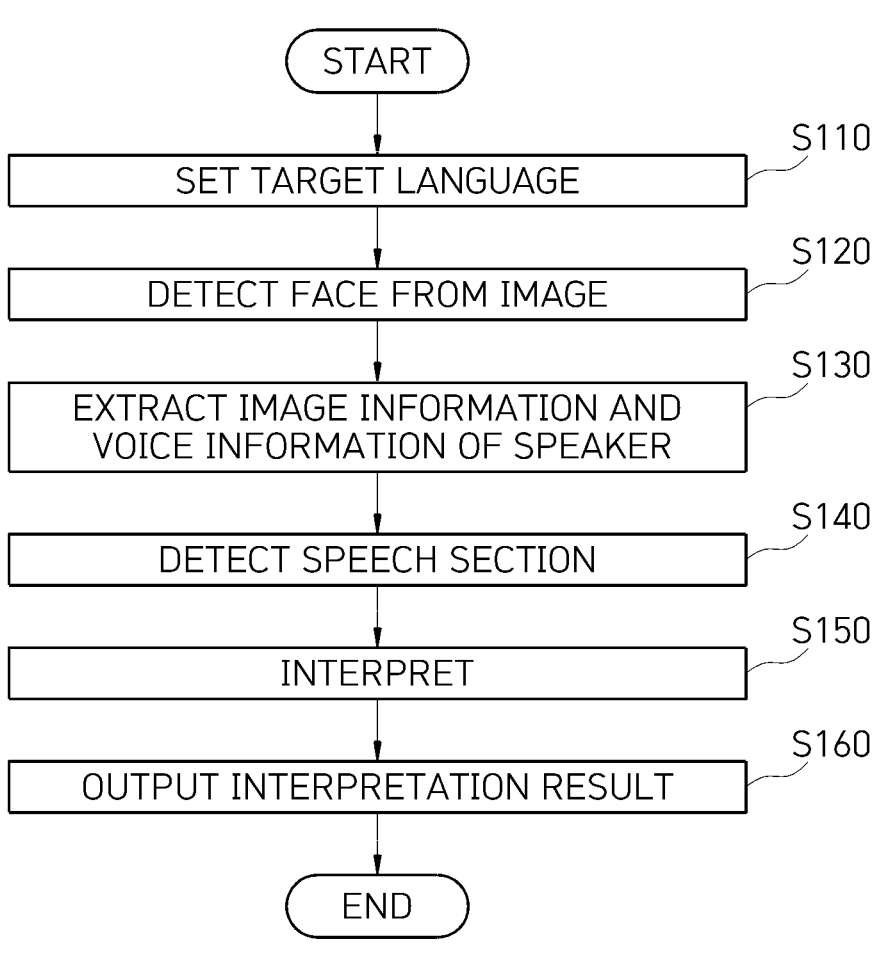
FIG. 1 is a flowchart for describing a gaze-based and augmented automatic interpretation method according to an embodiment of the present invention.

In general, automatic interpretation operates in such a way that only user's voice is interpreted and transmitted to the other terminal, or an interpretation result received from the other terminal is synthesized and told to the user. This method aims at a face-to-face conversation in which a user and a counterpart exist.

However, in the case where a user needs to actively receive foreign language voices to obtain information such as cases where a user travels abroad, where a user has conversations with foreigners (tourism, restaurants, shopping, hotels, business, etc.), and where a user needs to judge the situation by understanding airport guide voice, travel area TV news, and nearby foreign voice, the need for the automatic interpretation increases. That is, a technology capable of supporting interpretation of only foreign voices providing user's desired information is required.

Looking at the related art, a method in which a user directly touches his/her desired voice section to try automatic interpretation for the desired voice section, a method of separating individual voices and telling interpretation results in a situation where voices of multiple speakers are mixed as a situation that often occurs around users, and the like, have been suggested. However, it is very inconvenient in terms of usability for a user to directly designate a voice section through a button. An automatic voice section detector, which appeared to compensate for this, takes a method of securing an intended voice section in a noisy situation using only voice information, and therefore, has limitations in performance. In addition, a method of separating only desired voice from a mixed sound of multiple speakers and displaying the translated result is also difficult to secure stable performance. In addition, there is a disadvantage in that the voice generated through the separation process may confuse a user by transmitting not only the desired voice but also unnecessary interpretation results.

Unlike the related art, the present invention may narrow a range of information collection targets by utilizing voice information as well as gaze input image information in which user's intention is reflected, and obtain robust interpretation results by interpreting only voices of speakers existing within the range. That is, the present invention proposes an automatic interpretation system and method capable of outputting an interpretation result by reflecting user's intention according to user's gaze movement by using image information and voice information together. In particular, the present invention provides a method for a user to quickly and naturally acquire information from voices occurring in the surroundings or spoken voices of a conversation partner by providing a function of immediately interpreting and displaying naturally speech of a speaker that a user is listening to on a screen without user manipulation. In addition, since smart glasses (e.g., Google Glass, Apple Glass) that will be widely used in the future may be used as they are, the scope of application of the present invention is also very wide. By utilizing the present invention, a user may visualize voices of multiple speakers occurring in the user's surroundings in his or her native language, so the user may conveniently obtain multilingual voice information of the user's surroundings.

Various advantages and features of the present invention and methods accomplishing them will become apparent from the following description of embodiments with reference to the accompanying drawings. However, the present invention is not limited to exemplary embodiments to be described below, but may be implemented in various different forms, these embodiments will be provided only in order to make the present invention complete and allow those skilled in the art to completely recognize the scope of the present invention, and the present invention will be defined by the scope of the claims. Meanwhile, terms used in the present specification are for explaining exemplary embodiments rather than limiting the present invention. Unless otherwise stated, a singular form includes a plural form in the present specification. Components, steps, operations, and/or elements mentioned by terms "comprise" and/or "comprising" used in the present disclosure do not exclude the existence or addition of one or more other components, steps, operations, and/or elements.

In the present invention, a user terminal ('terminal') is a device that may receive multimodal information, receive an interpretation result or user information (speaker information) from a server (interpretation server or user information management server), and output the interpretation result through a screen or sound output unit, and is not limited in the form of implementation. For example, the terminal may be a smart device such as a smart phone or smart glasses.

In this specification, 'user's visual field' (or 'gaze range') may be a user's visible range. The 'user's visual field' may be determined based on a user's location and/or a direction in which a user's face is facing. The 'user's visual field' may be expressed as an angular range having a certain size in horizontal and vertical directions with a frontal direction of the user's face as a center or a normal of both eyes of the user as a standard. For example, ranges of −60° to 60° (binocular visual field) or −90° to 90° (monocular visual field) in the horizontal direction and −75° (bottom) to 55° (top) in the vertical direction centered on the frontal direction of the user's face field may be set as the 'user's visual field'. However, in the embodiment of the present invention, the 'user's visual field' may be limited or extended according to the characteristics of image information input means (e.g., smart glasses). For example, the 'user's visual field' may be limited within a field of view (FOV) range of a lens mounted on smart glasses worn by a user.

When it is decided that the detailed description of the known art related to the present invention may unnecessarily obscure the gist of the present invention, a detailed description therefor will be omitted.

Hereinafter, embodiments of the present disclosure will be described in detail with reference to the accompanying drawings. The same means will be denoted by the same reference numerals throughout the accompanying drawings in order to facilitate the general understanding of the present invention in describing the present invention.

FIG. 1 is a flowchart for describing a gaze-based and augmented automatic interpretation method according to an embodiment of the present invention.

The gaze-based and augmented automatic interpretation method according to the embodiment of the present invention includes steps S110 to S160.

Step S110 is a target language setting step. In this step, a target language for constructing an interpretation result is set. The target language may be set through a user terminal, and may be a language previously set for a corresponding user in an automatic interpretation system according to the present invention, or may be set in a manner selected by the user when an interpretation task is started.

Step S120 is an image-based face detection step. The user terminal (hereinafter 'terminal') receives multimodal information (image information and voice information) within the user's visual field. The terminal is a device that may receive multimodal information, receive an interpretation result or user information (speaker information) from a server (interpretation server or user information management server), and output the interpretation result through a screen or sound output unit (for example, speaker), and is not limited in the form of implementation. For example, the terminal may be a smart device such as a smart phone or smart glasses. The range of the image information included in the multimodal information may be adjusted by reflecting user's intention. For example, image information input to the terminal may be partially enlarged or reduced (zoom in, zoom out). The automatic interpretation system according to the present invention determines a range of a speaker (speaker to be interpreted) that a user wants to interpret based on the image information input to the terminal. The terminal or the interpretation server detects a speaker's face included in the image information. For example, when a terminal transmits the image information input to the terminal to the interpretation server, the interpretation server detects the speaker's face included in the image information. Thereafter, the terminal or the interpretation server performs a voice extraction and speech section detection operation, and determines the number of speakers based on the detected faces, and then, performs the voice extraction (voice separation for each speaker) and speech section detection operation in parallel as many as the number of speakers.

Step S130 is a step of extracting image information and voice information of a speaker. After the speaker's face is detected, the terminal or the interpretation server extracts each of the image information and voice information of the speaker corresponding to a detected face region from the image and voice collected by the terminal. That is, the terminal or the interpretation server separates image information of each speaker from the image collected by the terminal, and separates voice information of each speaker from the voice collected by the terminal. For example, when the terminal transmits the voice information input to the terminal to the interpretation server, the interpretation server extracts voice information of each speaker from the voice information.

The terminal or the interpretation server may increase reliability of voice extraction results for each speaker by utilizing the collected images or the images of individual speakers. For example, the terminal or the interpretation server may verify the voice extraction results for each speaker based on a mouth shape or the like of a speaker shown in the individual image information of the speaker.

When the interpretation module of the terminal or the interpretation server uses a pipelined interpretation engine, after step S130 ends, step S140 proceeds to extract voices of speech sections from voice information of each speaker. When the interpretation module of the terminal or the interpretation server uses an end-to-end interpretation engine, a preprocessing process (step S140) of detecting the speech section and extracting voice information of the speech section is not required, so step S150 is performed immediately after step S130 ends.

Step S140 is a speech section detection step. The terminal or the interpretation server detects the speech section in voice information of each speaker. That is, the terminal or the interpretation server detects the speech section by detecting start and end points of speech in voice information of each speaker. In this case, the terminal or the interpretation server may increase the reliability of detecting the start point and end point of the speech by utilizing individual image information of a speaker. For example, the terminal or an interpretation server may detect the speech section or verify the accuracy of the previously detected speech section by determining the speech based on the mouth shape of the individual speaker. The terminal or the interpretation server transmits the detected voice information of the speech section to the interpretation module (interpretation engine) built in the terminal or the interpretation server.

Step S150 is an interpretation step. The interpretation module generates the interpretation result based on the voice information to be interpreted. The voice information of the speaker or the voice information of the speech section may be the voice information to be interpreted. The interpretation result may be text in a target language or voice synthesized in the target language. In the present invention, the interpretation method of the interpretation module is not limited. For example, the interpretation module may use the pipelined interpretation engine that performs an interpretation operation using a speech recognition model and a machine translation model, or may use an end-to-end interpretation engine that performs the interpretation operation using a single interpretation model.

When the interpretation module uses the pipelined interpretation engine that performs the interpretation operation using the speech recognition model and the machine translation model, the interpretation module generates speech recognition results in the target language by inputting the voice information of the speech section generated in step S140 to the speech recognition model and generates the interpretation result by inputting the speech recognition result to the machine translation model.

On the other hand, when the interpretation module uses the end-to-end interpretation engine, the interpretation module generates the interpretation result by inputting the voice information of the speaker generated in step S130 to one interpretation model (for example, a trained neural network).

As another example, the interpretation module may generate the interpretation result based on the image information of the speaker and the voice information to be interpreted. Specifically, the interpretation module may generate the interpretation result by inputting the image information of the speaker and the voice information to be interpreted to a trained deep learning model (neural network), that is, a multimodal end-to-end interpretation engine.

In addition, the interpretation module may generate the interpretation result by inputting features (e.g., mouth shape) extracted from the image information of the speaker instead of the image information of the speaker to the trained deep learning model along with the voice information of the speaker.

Step S160 is a step of outputting the interpretation result. The terminal displays the interpretation result on the screen or outputs the interpretation result to the sound output unit (for example, speaker). When the interpretation result is generated from the interpretation server, the terminal needs to receive the interpretation result from the interpretation server.

When the terminal displays the interpretation result on the screen, the interpretation result text in the target language may be augmented and output to on the screen that a user sees. For example, when multiple speakers speak, the terminal may augment and output the interpretation result text in the target language to the image of the individual face region of the speaker.

When the terminal outputs the interpretation result to the sound output unit, the terminal outputs (reproduces) synthesized sound in the target language. In this case, the synthesized sound may be a synthesized voice similar to a tone of the speaker. The terminal may generate and output the synthesized sound based on the text in the target language, or may receive and output the synthesized sound generated by the interpretation server from the terminal.

Figure 2:
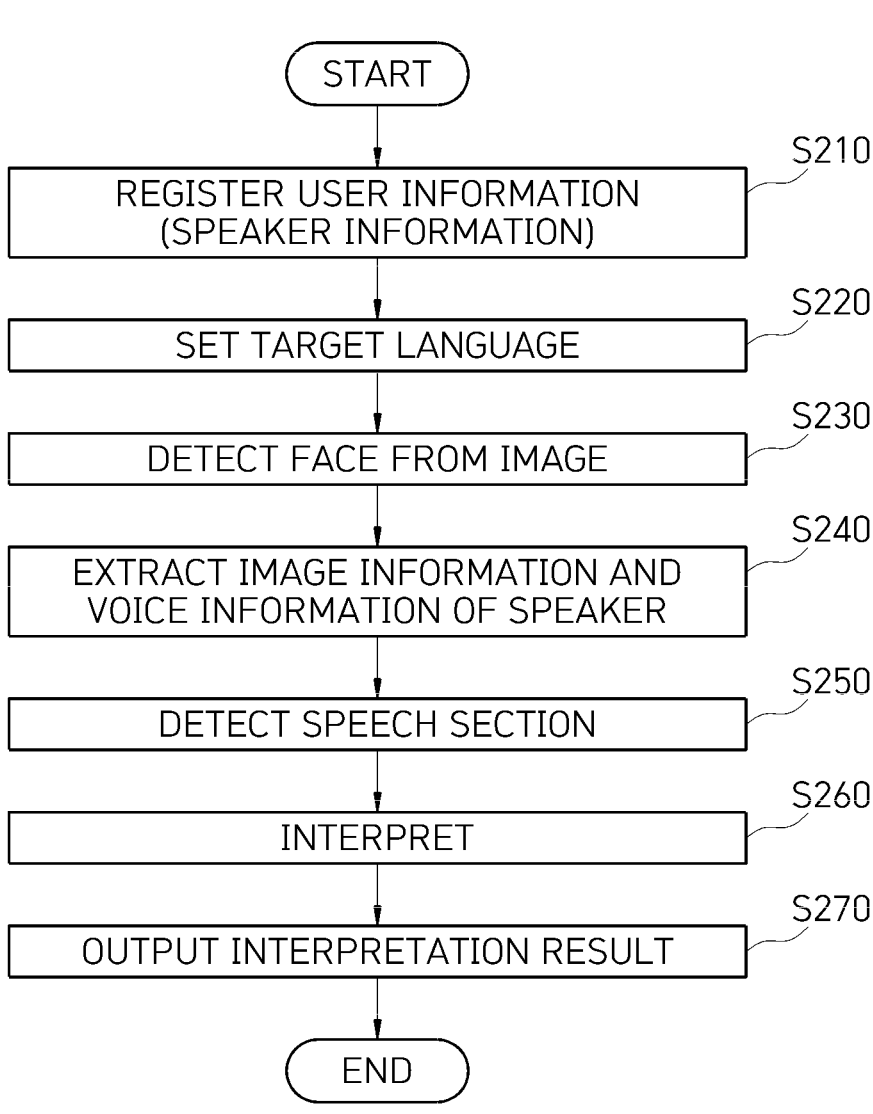
FIG. 2 is a flowchart for describing the gaze-based and augmented automatic interpretation method according to the embodiment of the present invention.

FIG. 2 is a flowchart for describing the gaze-based and augmented automatic interpretation method according to the embodiment of the present invention. The embodiment of FIG. 2 assumes that user information is registered in the server (interpretation server or user information management server) of the automatic interpretation system according to the present invention, and proposes a method of utilizing user information for interpretation in a conversation between a plurality of registered users. That is, the embodiment of FIG. 2 relates to an automatic interpretation method using user information (speaker information) registered in the interpretation server when multiple users simultaneously use a multimodal automatic interpretation system. The automatic interpretation method according to the embodiment of FIG. 2 includes steps S210 to S270.

Step S210 is a step of registering user information (speaker information). Individual users of the automatic interpretation system register their voice information, face information, and target language on the server (interpretation server or user information management server) at the time of first use. The server transmits information on a user's voice, a user's face, and a user's target language to a user information database (user information DB), and the information is stored in the user information database.

Step S220 is a target language setting step. In this step, the target language for constructing the interpretation result is set. The target language may be set through the user terminal, and may be set to the user's target language registered in the server (interpretation server or user information management server) by the user of the terminal, and the user may change the set target language to another language.

Step S230 is an image-based face detection step. The terminal receives the multimodal information (image information and voice information) in the user's visual field. The range of the image information included in the multimodal information may be adjusted by reflecting user's intention. The automatic interpretation system according to the present invention determines a range of a speaker (speaker to be interpreted) that a user wants to interpret based on the image information input to the terminal. The terminal or the interpretation server detects a speaker's face included in the image information. For example, when a terminal transmits the image information input to the terminal to the interpretation server, the interpretation server detects the speaker's face included in the image information.

When the terminal detects a face, the terminal transmits the detected face information to the server (interpretation server or user information management server).

The server (interpretation server or user information management server) identifies a user (speaker) corresponding to the detected face through similarity analysis between the detected face information and the face information registered in the server (face information stored in the user information DB). Accordingly, the server may extract the registered voice information (referring to the voice information of the speaker registered in the server) of the corresponding speaker from the user information DB based on the speaker identification result. In addition, the server may extract the use language of the corresponding speaker from the user information DB based on the speaker identification result. The use language information of the speaker may be used in steps S240 and S260. For example, in the process of extracting voice of a specific speaker from mixed voice of multiple speakers, or in the process of recognizing the voice information to be interpreted and generating the text in the target language, the terminal or the interpretation server may use the use language information of the speaker. The terminal or the interpretation server may robustly extract the voice of the specific speaker from the mixed voice by using the use language information of the speaker, so the interpretation may be performed naturally.

Thereafter, the terminal or the interpretation server performs the voice extraction and speech section detection operation later, and determines the number of speakers based on the detected faces, and then, performs the voice extraction (voice separation for each speaker) and speech section detection operation in parallel as many as the number of speakers.

Step S240 is a step of extracting the image information and voice information of the speaker. After the speaker's face is detected, the terminal or the interpretation server extracts the individual image information and the voice information of the speaker (image and voice to be interpreted) for the detected region from the image and voice collected by the terminal. That is, the terminal or the interpretation server separates the image and voice of the individual speakers from the image and voice collected by the terminal. For example, when the terminal transmits the voice information input to the terminal to the interpretation server, the interpretation server extracts voice information of each speaker from the voice information.

The terminal or the interpretation server (interpretation server or user information management server) may extract only the voice of the individual speaker to be interpreted by the user from the mixed voice of multiple speakers based on the voice information of the speaker (registered voice information of the speaker) registered in the server.

As another example of the present invention, the terminal or the interpretation server may separate the user's voice from the mixed voice based on the user's voice information registered in the server, identify who the speaker is talking to the user based on the user's voice, select the identified speaker as the speaker to be interpreted, and extract the corresponding voice information of the speaker. For example, when the time the user's speech ends and the time the speech of the specific speaker starts are included within a certain time range, or when the time the user's speech starts and the time the speech of the specific speaker ends are included within a certain time range, the terminal or the interpretation server will be able to extract only the voice of the specific speaker. When the speaker to be interpreted is selected, the terminal or the interpretation server may extract the corresponding voice information of the speaker even if the corresponding speaker deviates from the image information (screen).

The terminal or the interpretation server may increase the reliability of the voice extraction results for each speaker by utilizing the collected images or the images of individual speakers. For example, the terminal or the interpretation server may verify the voice extraction results for each speaker based on the mouth shape or the like of the speaker shown in the individual speaker image.

When the interpretation module of the terminal or the interpretation server uses the pipelined interpretation engine, after step S240 ends, step S250 proceeds to extract the voice information of the speech section from the individual voice information of the speaker to be interpreted. When the interpretation module of the terminal or the interpretation server uses the end-to-end interpretation engine, a preprocessing process (step S250) of detecting the speech section and extracting the voice information of the speech section is not required, so step S260 is performed immediately after step S240 ends.

Step S250 is a speech section detection step. The terminal or the interpretation server detects the speech section in each of the voice information of the speaker. That is, the terminal or the interpretation server detects the speech section by detecting start and end points of speech in voice information of each speaker. In this case, the terminal or the interpretation server may increase the reliability of detecting the start point and end point of the speech by utilizing the individual image information of the speaker. For example, the terminal or an interpretation server may detect the speech section or verify the accuracy of the previously detected speech section by determining the speech based on the mouth shape of the individual speaker. The terminal or the interpretation server transmits the detected voice information of the speech section to the interpretation module (interpretation engine) built in the terminal or the interpretation server.

Step S260 is an interpretation step. The interpretation module generates the interpretation result based on the voice information to be interpreted. The voice information of the speaker or the voice information of the speech section may be the voice information to be interpreted. The interpretation result may be text in a target language or voice synthesized in the target language. In the present invention, the interpretation method of the interpretation module is not limited. For example, the interpretation module may use the pipelined interpretation engine that performs an interpretation operation using the speech recognition model and the machine translation model, or may use the end-to-end interpretation engine that performs the interpretation operation using the single interpretation model.

When the interpretation module uses the pipelined interpretation engine that performs the interpretation operation using the speech recognition model and the machine translation model, the interpretation module generates the speech recognition results in the target language by inputting the voice information of the speech section generated in step S250 to the speech recognition model and generates the interpretation result by inputting the speech recognition result to the machine translation model.

On the other hand, when the interpretation module uses the end-to-end interpretation engine, the interpretation module generates the interpretation result by inputting the voice information of the speaker generated in step S240 to one interpretation model (for example, a trained neural network).

As another example, the interpretation module may generate the interpretation result based on the image information of the speaker and the voice information to be interpreted. Specifically, the interpretation module may generate the interpretation result by inputting the image information of the speaker and the voice information to be interpreted to a trained deep learning model (neural network), that is, a multimodal end-to-end interpretation engine.

In addition, the interpretation module may generate the interpretation result by inputting features (e.g., mouth shape) extracted from the image information of the speaker instead of the image information of the speaker to the trained deep learning model.

Step S270 is a step of outputting the interpretation result. The terminal displays the interpretation result on the screen or outputs the interpretation result to the sound output unit. When the interpretation result is generated from the interpretation server, the terminal needs to receive the interpretation result from the interpretation server.

When the terminal displays the interpretation result on the screen, the interpretation result text in the target language may be augmented and output to on the screen that a user sees. For example, when multiple speakers speak, the terminal may augment and output the interpretation result text in the target language to the image of the individual face region of the speaker.

When the terminal outputs the interpretation result to the sound output unit, the terminal outputs (reproduces) synthesized sound in the target language. In this case, the synthesized sound may be a synthesized voice similar to a tone appearing in the voice information of the speaker (registered voice information of the speaker) registered in the server (interpretation server or user information management server). The terminal may generate and output the synthesized sound based on the text in the target language, or may receive and output the synthesized sound generated by the interpretation server from the terminal.

FIG. 3 is a flowchart for describing a gaze-based and augmented automatic interpretation method according to an embodiment of the present invention.

The embodiment of FIG. 3 adds an image-based situation determination step (S350) and a word/phrase extraction step (S360) to the embodiment of FIG. 1, and FIG. 3 illustrates an embodiment of improving the automatic interpretation performance using situation information obtained from image analysis. The automatic interpretation method according to the embodiment of FIG. 3 includes steps S310 to S380. Steps S310, S320, S330, S340, S370, and S380 are basically the same as the respective steps of steps S110 to S160, respectively, and the contents of the performance. Accordingly, the descriptions of the same contents as those of the embodiment of FIG. 1 will be omitted. However, in this embodiment, steps S320 and S350 are performed in parallel after step S310 is performed, and step S370 is performed after steps S340 and S360 end. The embodiment of FIG. 3 will be described below based on differences from the embodiment of FIG. 1.

In the automatic interpretation system, subject (e.g., travel, food, science, etc.) or situation information (e.g., a situation of asking for directions to a destination, a situation of ordering food at a restaurant, etc.) is very important information to improve interpretation performance.

In particular, in the case of interpreting the voice information to be interpreted that includes proper nouns, the subject or situation information has a great influence on the interpretation performance.

Steps S350 and S360 are steps added to the embodiment of FIG. 1 to reflect subject or situation information to interpretation.

Figure 4:
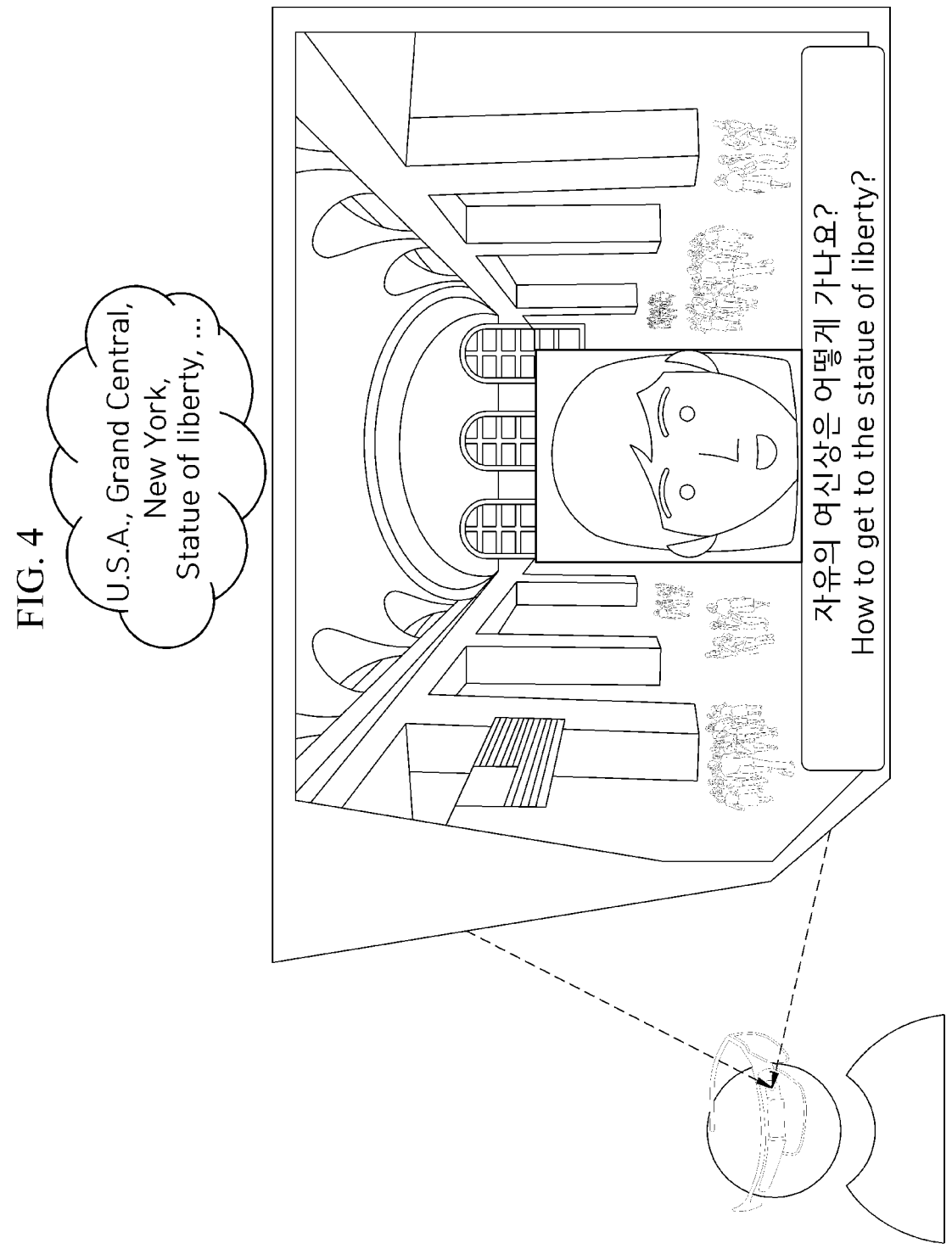
FIG. 4 is an exemplary view of image-based situation determination and word extraction according to an embodiment of the present invention.

Step S350 is an image-based situation determination step. The terminal or the interpretation server analyzes the image information input to the terminal to determine the subject or situation. Specifically, the terminal or the interpretation server may determine a subject or situation based on features such as text, objects, distribution of multiple objects, features (shape of building, shape and arrangement of windows, arrangement and orientation of outlines) of the user's surrounding environment, and color recognized in the image. The terminal or the interpretation server may infer the subject or situation by inputting the image information or the features extracted from the image information to the pre-trained deep learning model. FIG. 4 illustrates a situation in which a speaker inquires about how to get to the Statue of Liberty from Grand Central Terminal while traveling in the United States. The terminal or the interpretation server may infer a subject or situation through image analysis or generate an embedding vector (latent vector or representation) related to the subject or situation. For example, the terminal or the interpretation server may determine that the speaker is moving from Grand Central Terminal to another location based on the image information of the speaker.

Step S360 is a step of extracting words or phrases related to the situation. First, the terminal or the interpretation server may extract related words or phrases based on the situation determination result generated in step S350. For example, the terminal or the interpretation server may extract words/phrases related to the subject or situation derived as a result of step S350 from the situation-word database. In this process, the terminal or the interpretation server may extract the related words/phrases based on the embedding vector related to the subject or situation. As shown in the example of FIG. 4, the terminal or the interpretation server may extract words/phrase such as 'U.S.A.', 'Grand Central (Terminal)', 'New York', and 'Statue' in the database based on the information that the speaker moves from Grand Central Terminal to another location.

As another example, the terminal or the interpretation server may recognize text in an image and extract words or phrases from the text. For example, the terminal or the interpretation server may extract a brand name or trade name from a sign appearing in an image, or extract a restaurant or dish name from a restaurant menu board appearing in an image. The terminal or the interpretation server may treat words or phrases directly extracted from the image information as words/phrases related to the situation and use the words or phrases for interpretation.

Step S370 is an interpretation step. The interpretation module generates the interpretation result based on the voice information to be interpreted. The voice information of the speaker generated in step S330 or the voice information of the speech section generated in step S340 may be the voice information to be interpreted. The interpretation result may be the text in the target language or the voice synthesized in the target language.

The interpretation module may reflect the information/ data derived in step S360 to the interpretation process. That is, the interpretation module may reflect at least one of a subject, a situation, a subject-related embedding vector, a situation-related embedding vector, a subject-related word/ phrase, and a situation-related word/phrase to the interpretation process. For example, in the process of recognizing the voice information to be interpreted, the interpretation module may recognize a pronunciation similar to a word related to a situation as a corresponding word.

When subject/situation information, embedding vectors or words/phrases related to the subject/situation, etc., are used in the interpretation process, the accuracy of the voice recognition may be improved and the quality of interpretation may be improved because the information about the user surrounding is reflected in the interpretation.

Meanwhile, the embodiment of FIG. 3 shows an example in which step S370 is branched from step S310 or performed after steps S340 and S360 end for better understanding, but the scope of the present invention is not limited to such an example. The automatic interpretation method according to the present invention may use an interpretation model that integrally trains image, voice, and situation information to improve interpretation performance.

The gaze-based and augmented automatic interpretation method described above with reference to FIGS. 1 to 4 has been described with reference to flowcharts presented in the drawings. For simplicity, the method has been illustrated and described as a series of blocks, but the invention is not limited to the order of the blocks, and some blocks may occur with other blocks in a different order or at the same time as illustrated and described in the present specification. Also, various other branches, flow paths, and orders of blocks that achieve the same or similar result may be implemented. In addition, all the illustrated blocks may be not required for implementation of the methods described in the present specification.

Meanwhile, in the description with reference to FIGS. 1 to 3, each operation may be further divided into additional operations or combined into fewer operations according to an implementation example of the present invention. Also, some steps may be omitted if necessary, and an order between the operations may be changed. For example, in the embodiment of FIG. 1, step S110 or step S160 may be omitted. In addition, when the interpretation module of the automatic interpretation system according to the present invention uses the end-to-end interpretation engine, steps S140, S250, and S340 which are preprocessing processes for detecting a speech section may be omitted. In addition, the contents of FIGS. 4 and 11 may be applied to the contents of FIGS. 1 to 3 even if other contents are omitted. Also, the contents of FIGS. 1 to 3 may be applied to the contents of FIGS. 4 to 11.

Figure 5:
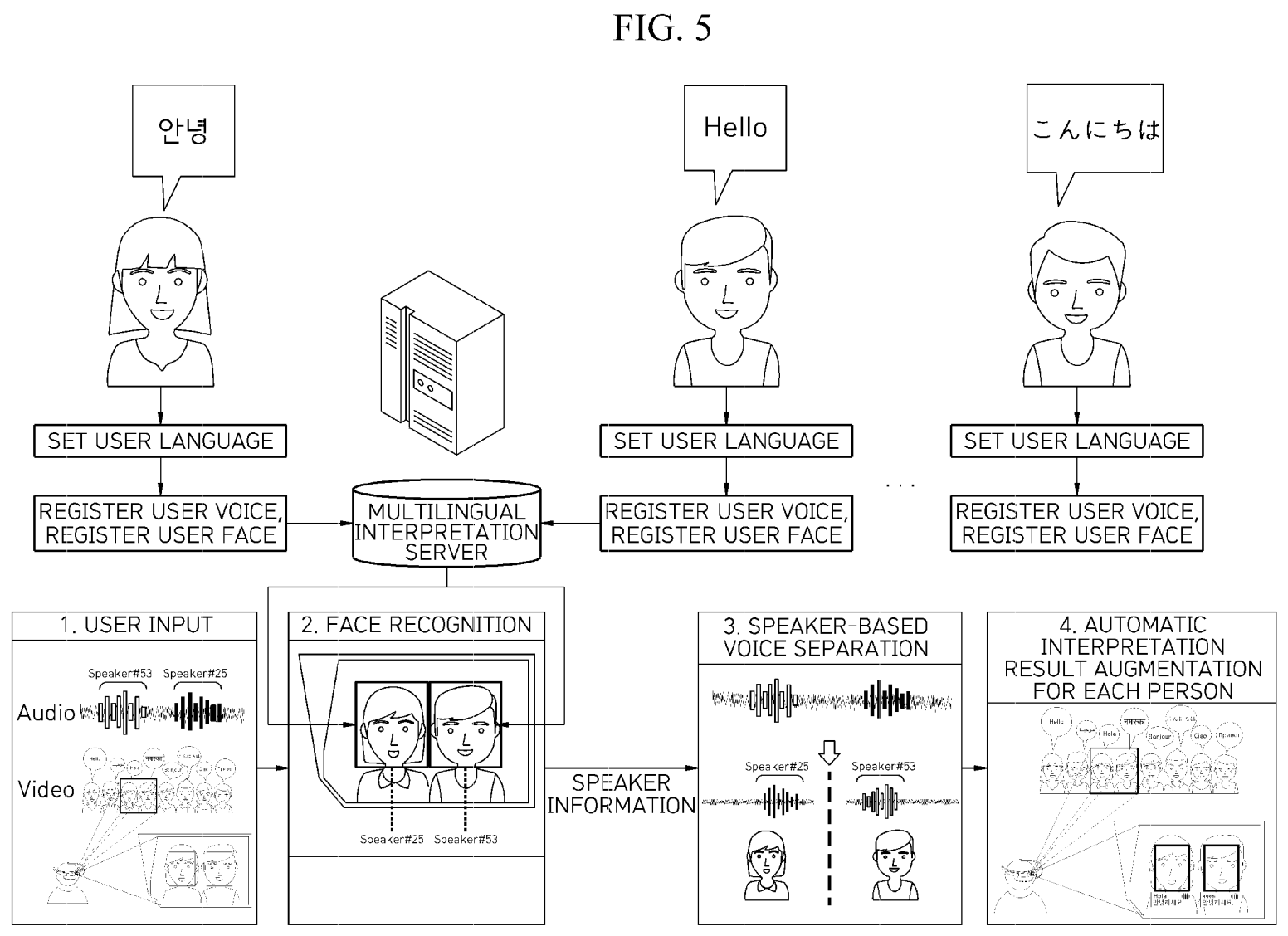

FIG. 5 is a reference diagram illustrating an automatic interpretation process according to an embodiment of the present invention. FIG. 5 illustrates a case in which the voice information to be interpreted by multiple speakers using different languages is mixed. When using the automatic interpretation system according to the present invention for the first time, an individual user (speaker) registers his or her face, voice, and use language (which becomes the target language for the corresponding user) in a server (interpretation server or user information management server). The first registration time may vary depending on the situations of individual users. After the first registration, registration information is stored/managed in the server. Thereafter, when the user uses the automatic interpretation system, the terminal or the interpretation server may check (identify) which speaker's face is the face in the visual field. The terminal or the interpretation server may improve interpretation quality by effectively separating the individual voice information of the speaker from the mixed voice of multiple speakers based on the speaker's registered voice information. When the interpretation of the voice information of multiple speakers is completed, the interpretation result may be augmented and displayed on the face image of each speaker.

Figure 6:
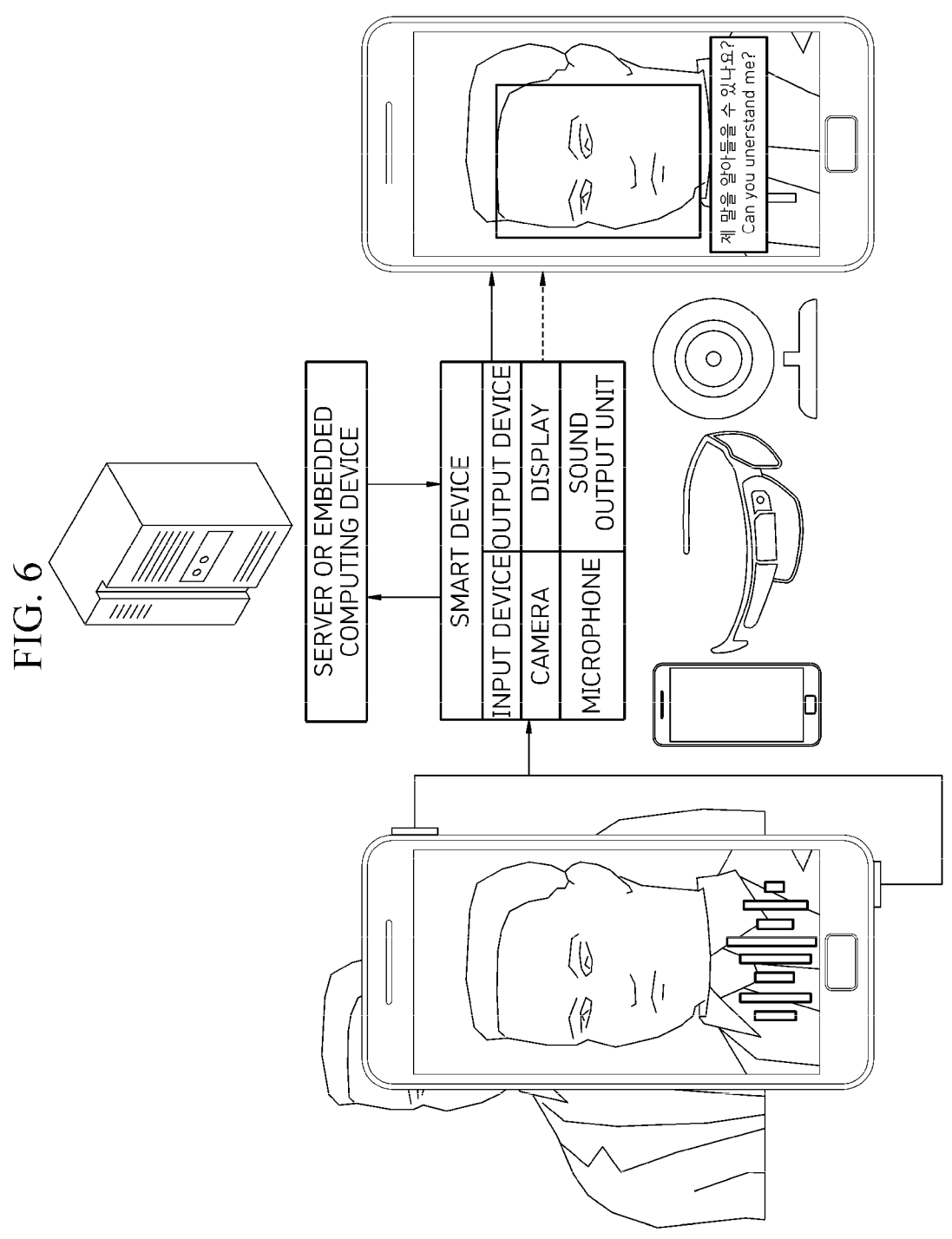
FIG. 6 is an exemplary diagram illustrating a case of displaying an interpretation result for a single speaker on a smartphone according to an embodiment of the present invention.

FIG. 6 is an exemplary diagram illustrating a case of displaying an interpretation result for a single speaker on a smartphone according to an embodiment of the present invention.

FIG. 6 illustrates the operation of the automatic interpretation system when an interpreter is limited to one person. The user terminal (smart device) may receive the voice information and the image information and transmit the received voice information and image information to the server, and then, receive and output the interpretation result from the server and receive and output the interpretation result from the built-in interpretation module (embedded computing device).

Figure 7:
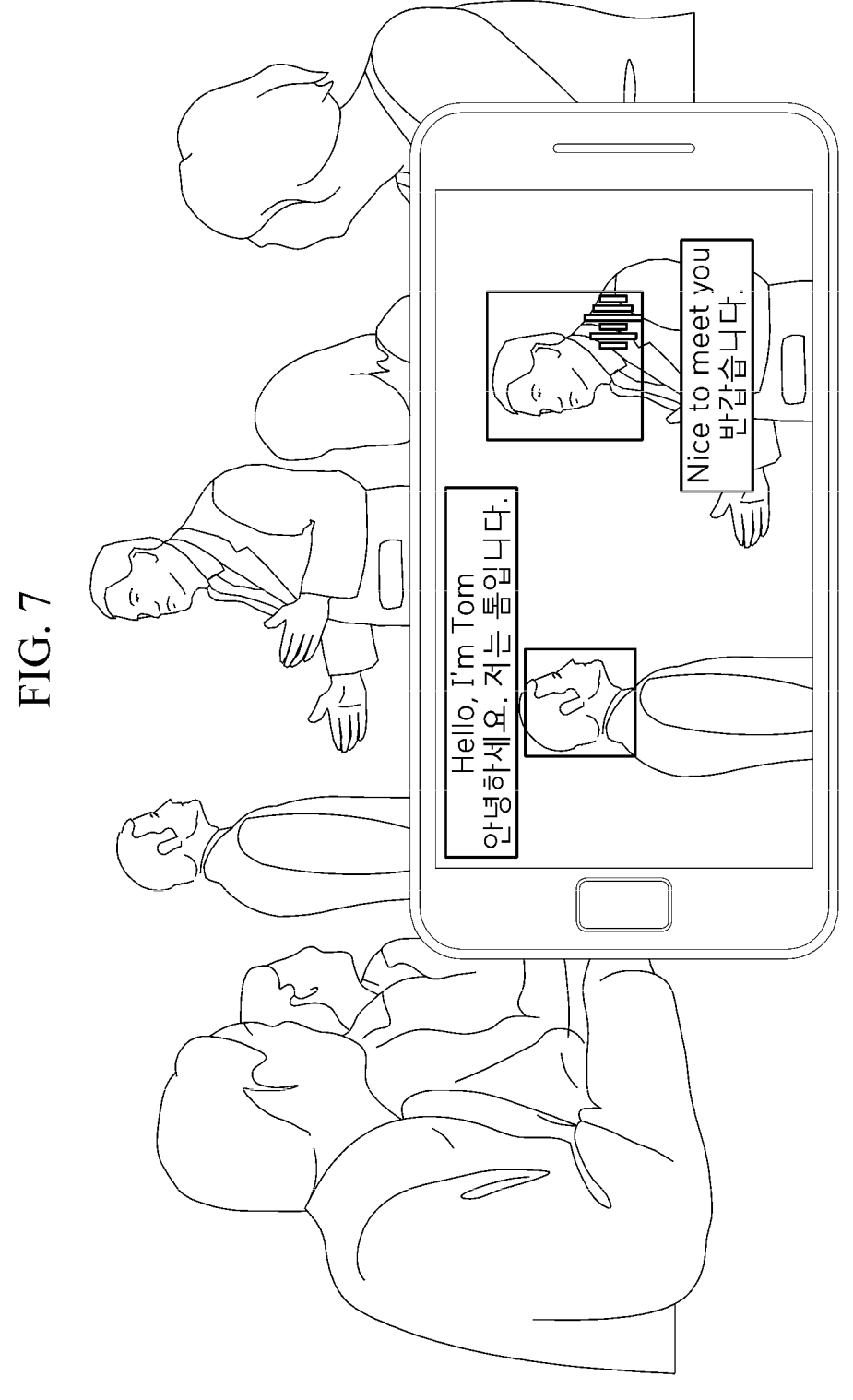
FIG. 7 is an exemplary diagram illustrating a case of displaying an interpretation result for a multiple speaker on a smartphone according to an embodiment of the present invention.

FIG. 7 is an exemplary diagram illustrating a case of displaying the interpretation result for a multiple speaker on a smartphone according to an embodiment of the present invention.

FIG. 7 illustrates an appearance in which the automatic interpretation system according to the present invention operates by limiting speakers according to the visual field of the terminal (smart device) when there are multiple speakers to be interpreted In a situation where multiple speakers speak at the same time, the terminal naturally reflects the user's intention in the interpretation result by providing only the automatic interpretation result for the speaker within the user's visual field. When the user terminal is a smart glass instead of a smart phone, the above effect may be maximized.

Figure 8:
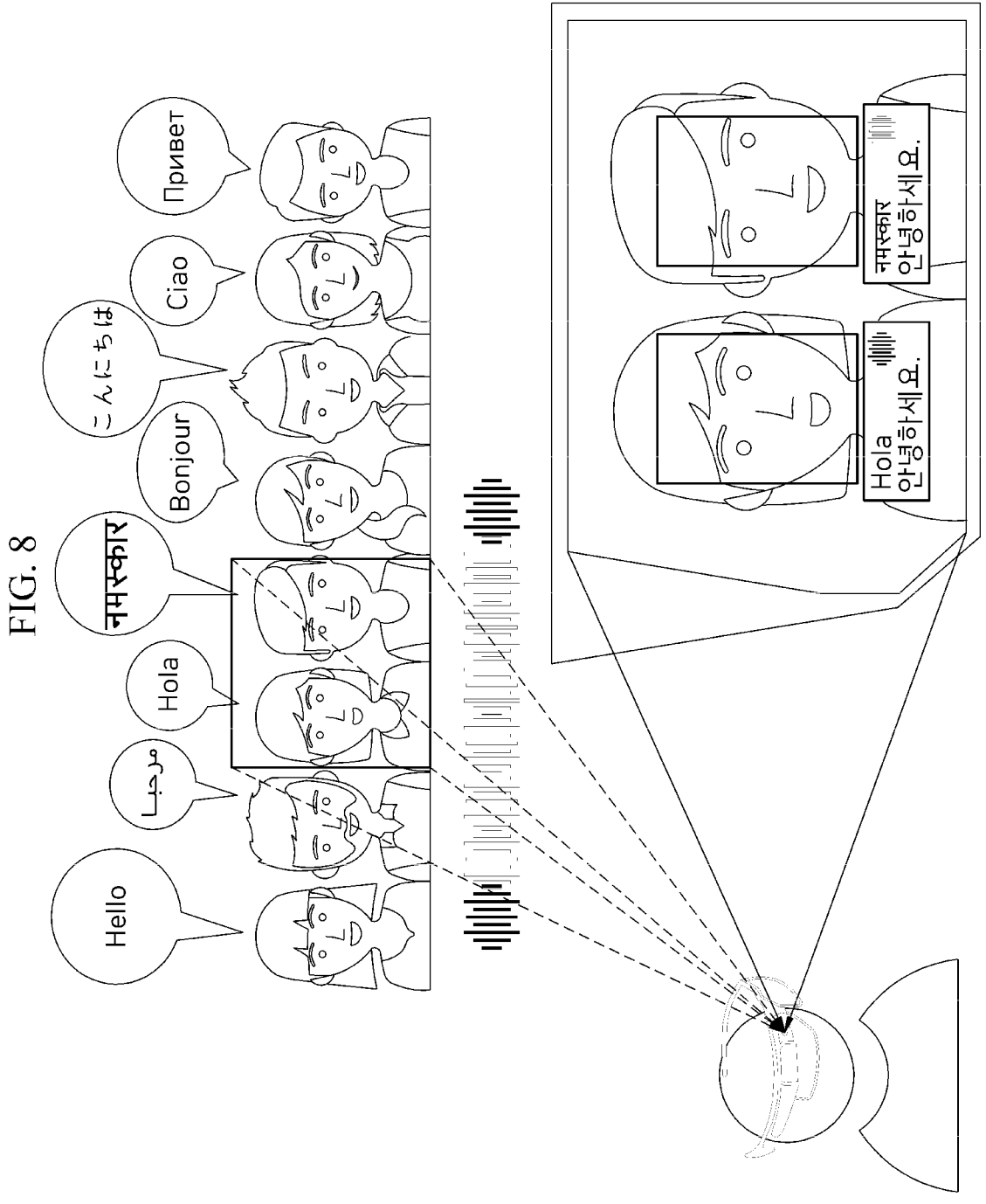
FIG. 8 is an exemplary diagram illustrating a case of displaying an interpretation result through smart glasses in a multilingual speech situation according to an embodiment of the present invention.

FIG. 8 is an exemplary diagram illustrating a case of displaying an interpretation result through smart glasses in a multilingual speech situation according to an embodiment of the present invention. The example of FIG. 8 illustrates an example in which the smart glasses worn by the user display the interpretation result in the user's target language when the interpretation target uses multiple languages at the same time. The interpretation server or the terminal (smart glasses in this example) according to the present invention automatically identifies each language in multilingual speech. The terminal (smart glasses) displays target language interpretation results for multilingual voices within the image range for each speaker.

Figure 9:
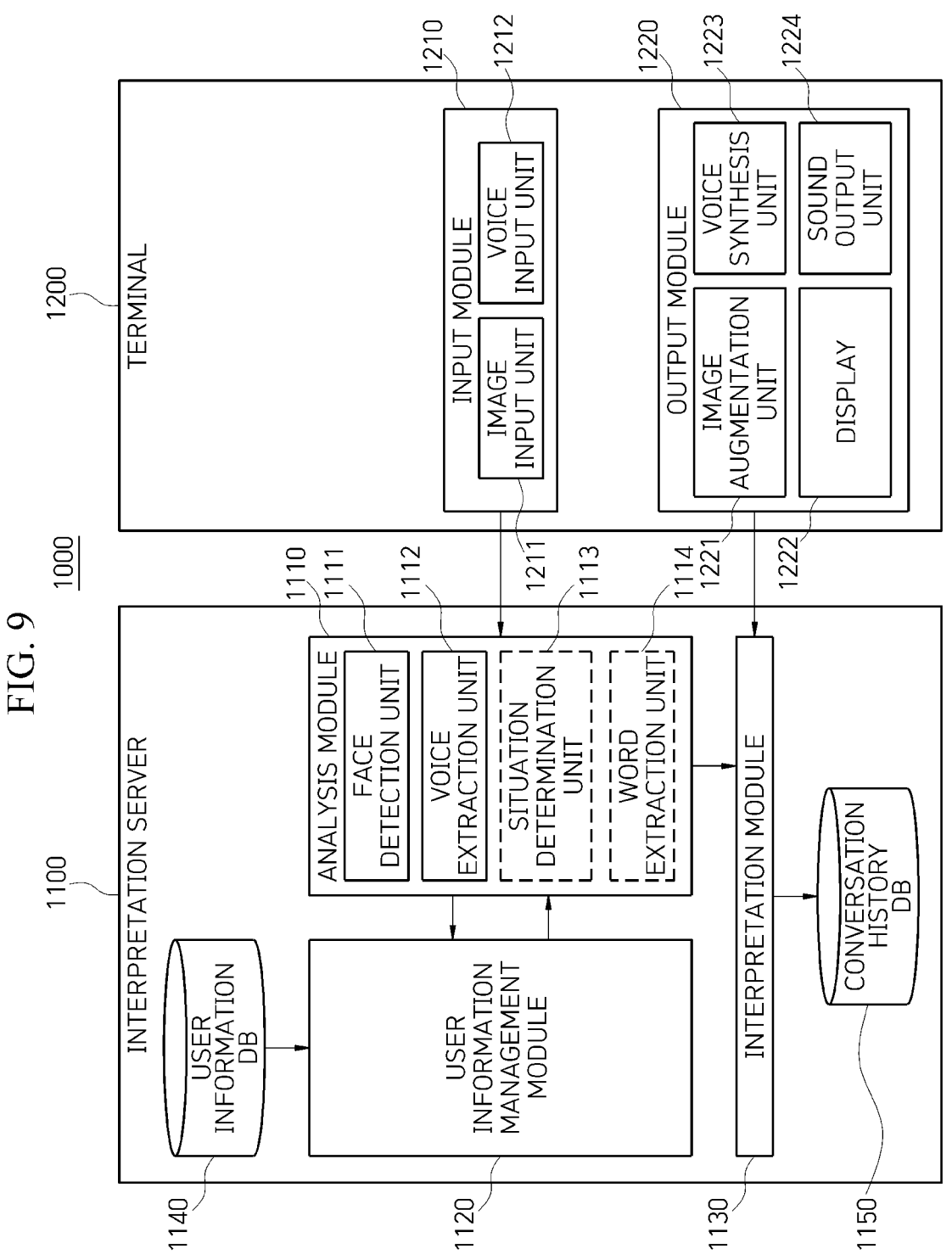
FIG. 9 is a block diagram illustrating a configuration of a gaze-based and augmented automatic interpretation system according to a first embodiment of the present invention.

FIG. 9 is a block diagram illustrating a configuration of a gaze-based and augmented automatic interpretation system according to a first embodiment of the present invention.

A gaze-based and augmented automatic interpretation system 1000 according to a first embodiment of the present invention is configured to include an interpretation server 1100 and a terminal 1200.

The interpretation server 1100 registers information of a user (user information) of the gaze-based and augmented automatic interpretation system 1000. The user information includes the user's voice information, the user's face information, and the user's language. Among them, the user's language may be a target language for interpretation. The interpretation server 1100 may receive the user information from the terminal 1200 and register the received user information. The terminal 1200 may receive the user's language included in the user information from the interpretation server 1100 and set the target language, or may set the target language through direct input by the user. The terminal 1200 receives multimodal information (image information and voice information) in the user's visual field, and transmits the multimodal information to the interpretation server 1100. The interpretation server 1100 generates the interpretation result based on the multimodal information and transmits the generated interpretation result to the terminal 1200. The terminal 1200 displays the interpretation result through the display 1222 or reproduces the displayed interpretation result through the sound output unit 1224 (for example, speaker).

The interpretation server 1100 includes an analysis module 1110, a user information management module 1120, and an interpretation module 1130, and may further include a user information DB 1140 and a conversation history DB 1150. Also, the terminal 1200 includes an input module 1210 and an output module 1220.

A face detection unit 1111 of the analysis module 1110 detects the speaker's face included in the image information received by the input module 1210, and transmits the detected face information to the user information management module 1120.

The user information management module 1120 identifies a user (speaker) corresponding to the detected face through similarity analysis between the detected face information and the information stored in the user information DB 1140. Unless the user specifically changes it through the terminal 1200, the speaker whose face is detected by the face detection unit 1111 in the image information becomes an interpretation target. The user information management module 1120 extracts the speaker's registered voice information from the user information DB 1140 based on the speaker's identifier and transmits the extracted speaker's registered voice information to a voice extraction unit 1112. Also, the user information management module 1120 may transmit the registered voice information of the speaker to the terminal 1200, and the registered voice information may be used to synthesize voice in the output module 1220.

When there are multiple speakers with faces detected, the user information management module 1120 transmits registered voice information of multiple speakers corresponding thereto to the voice extraction unit 1112. In this case, the interpretation server 1100 generates the interpretation results of the multiple speakers in parallel. That is, the interpretation server 1100 performs the voice extraction, speech section detection, and interpretation operations for each speaker in parallel.

The face detection unit 1111 extracts the individual image information of the speaker for the detected face region from the image information (image information input to the terminal 1200) received by the input module 1210. That is, the face detection unit 1111 extracts the image information of the speaker to be interpreted from the image information. The face detection unit 1111 may transmit the individual image information of the speaker to the interpretation module 1130.

The voice extraction unit 1112 extracts the individual voice information of the speaker from the voice information received by the input module 1210. The voice extraction unit 1112 may extract the individual voice information of the speaker from the voice information (voice information input to the terminal 1200) received by the input module 1210 based on the registered voice information of the speaker. As another example, the voice extraction unit 1112 may extract the individual the voice information of the speaker from the voice information (voice information input to the terminal 1200) received by the input module 1210 based on the image information of the speaker. The voice extraction unit 1112 may extract the corresponding voice information of the speaker by utilizing both the registered voice information of the speaker and the image information of the speaker.

When the interpretation module 1130 uses the end-to-end interpretation engine, the voice extraction unit 1112 transmits the individual voice information of the speaker to the interpretation module 1130.

The voice extraction unit 1112 detects the speech section from the voice information of the speaker. That is, the voice extraction unit 1112 generates the voice information of the speech section from the voice information of the speaker. The voice extraction unit 1112 may increase the reliability of detection of the start and end points of the speech by utilizing the individual image information of the speaker. The voice extraction unit 1112 transmits the voice information of the speech section of each speaker to the interpretation module 1130.

The analysis module 1110 may further include a situation determination unit 1113 and a word extraction unit 1114 in addition to the face detection unit 1111 and the voice extraction unit 1112. The situation determination unit 1113 analyzes the image information (image information input to the terminal 1200) received by the input module 1210 to determine a subject or situation. The situation determination unit 1113 may generate the embedding vector related to the subject or situation by analyzing the image information.

The word extraction unit 1114 may extract words or phrases related to the subject or situation determined by the situation determination unit 1113 from the situation-word database. In this process, the word extraction unit 1114 may extract the related words/phrases based on the embedding vector related to the subject or situation. Also, the word extraction unit 1114 may recognize text from the image information (image information input to the terminal 1200) received by the input module 1210 and extract the words or phrases related to the situation from the text.

The interpretation module 1130 generates the interpretation result based on the voice information to be interpreted. The voice information to be interpreted may be the voice information of the speaker or the voice information of the speech section. The interpretation result may be the text in the target language or the voice synthesized in the target language. The interpretation module 1130 may generate the interpretation result using the speech recognition model and the machine translation model based on the speech section voice information (pipeline type), and generate the interpretation result using the integrated interpretation model based on the voice information of the speaker. In addition, the interpretation module 1130 may generate the interpretation result by using the integrated interpretation model (for example, a trained deep learning model) based on the image information of the speaker and the speaker's voice information to be interpreted. For example, the interpretation module 1130 may input the image information of the speaker and the voice information to be interpreted of the speaker to the interpretation model to obtain the interpretation result which is an output value.

As another example, the interpretation module 1130 may generate the synthesized sound composed of the target language based on the interpretation result and the speaker voice information registered in the interpretation server 1100. The synthesized sound may be a synthesized voice similar to a tone appearing in the registered voice information of the speaker.

Meanwhile, when the analysis module 1110 includes the situation determination unit 1113 and the word extraction unit 1114, the interpretation module 1130 may reflect information related to the subject or situation in the process of generating the interpretation result based on the voice information of the target of interpretation. The information related to the subject or situation may be at least one of a subject, a situation, an embedding vector related to the subject, an embedding vector related to the situation, a word/phrase related to the subject, and a word/phrase related to the situation.

The interpretation module 1130 may transmit the interpretation result to the output module 1220 of the terminal 1200 and store the interpretation result in the conversation history DB 1150.

The input module 1210 of the terminal 1200 includes an image input unit 1211 and a voice input unit 1212. The image input unit 1211 receives the image information from the outside and transmits the received image information to the analysis module 1110, and the voice input unit 1212 receives the voice information from the outside and transmits the received voice information to the analysis module 1110.

The output module 1220 of the terminal 1200 includes an image augmentation unit 1221, a display 1222, a voice synthesis unit 1223, and a sound output unit 1224. The image augmentation unit 1221 adds the interpretation result to the image information and displays the image information through the display 1222. For example, the image augmentation unit 1221 displays, on the display 1222, an image obtained by adding text before and after interpretation, that is, text in a speaker's language and text in a target language, to image information. The voice synthesis unit 1223 generates a synthesized sound in a target language based on the interpretation result and the speaker's registered voice information, and reproduces the generated synthesized sound through the sound output unit 1224.

As another example, when the interpretation module 1130 generates the synthesized sound in the target language based on the interpretation result and the speaker's registered voice information, the interpretation module 1130 transmits the synthesized sound information to the output module 1220, and the voice synthesis unit 1223 reproduces the synthesized sound information through the sound output unit 1224.

Figure 10:
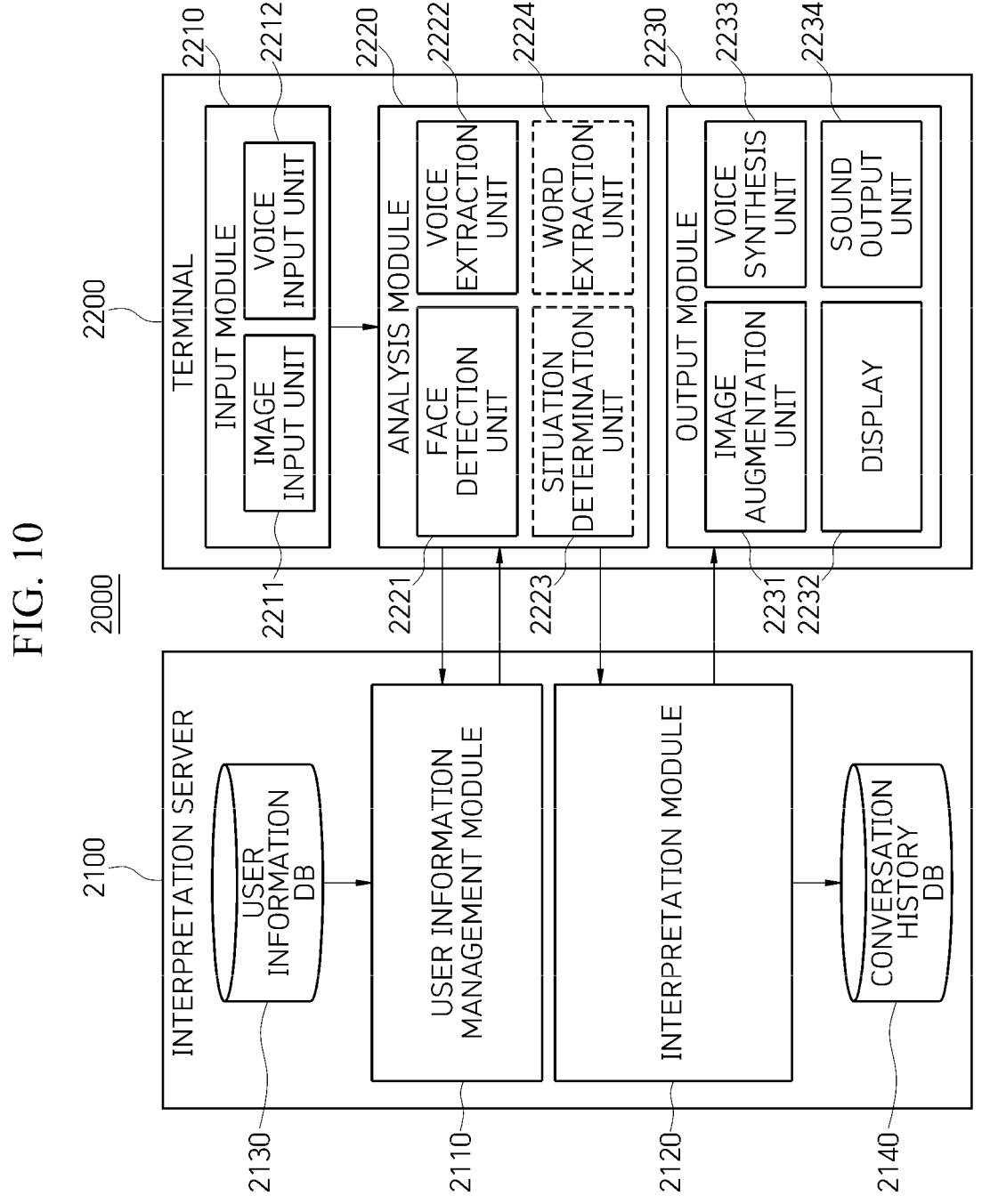
FIG. 10 is a block diagram illustrating a configuration of a gaze-based and augmented automatic interpretation system according to a second embodiment of the present invention.

FIG. 10 is a block diagram illustrating a configuration of a gaze-based and augmented automatic interpretation system according to a second embodiment of the present invention.

A gaze-based and augmented automatic interpretation system. 2000 according to a second embodiment of the present invention is configured to include an interpretation server 2100 and a terminal 2200.

Compared to the first embodiment, according to the second embodiment, an analysis module 2220 is further included in the terminal 2200. The second embodiment may be implemented when the processing performance of the processor built in the terminal 2200 is excellent.

The basic function of each module is the same as that of the first embodiment. That is, a user information management module 2110 has the same function as the user information management module 1120, an interpretation module 2120 has the same function as the interpretation module 1130, an input module 2210 has the same function as the input module 1210, the analysis module 2220 has the same function as the analysis module 1110, and the output module 2230 has the same function as the output module 1220. Accordingly, the communication between the analysis module 2220 and other modules will be mainly described below with respect to the second embodiment.

The input module 2210 of the terminal 2200 includes an image input unit 2211 and a voice input unit 2212. The image input unit 2211 receives the image information from the outside and transmits the received image information to the analysis module 2220, and the voice input unit 2212 receives the voice information from the outside and transmits the received voice information to the analysis module 2220.

A face detection unit 2221 of the analysis module 2220 detects the speaker's face included in the image information (image information input to the terminal 2200) received by the input module 2210, and transmits the detected face information to the user information management module 2110. In addition, the face detection unit 2221 extracts the individual image information of the speaker for the detected face region from the image information (image information input to the terminal 2200) received by the input module 2210. That is, the face detection unit 2221 extracts the image information of the speaker to be interpreted from the image information. The face detection unit 2221 may transmit the individual image information of the speaker to the interpretation module 2120.

The user information management module 2110 identifies a user (speaker) corresponding to the detected face through similarity analysis between the detected face information and the information stored in the user information DB 2130. Unless the user specifically changes it through the terminal 2200, the speaker whose face is detected by the face detector 2220 in the image information becomes an interpretation target. The user information management module 2110 extracts the speaker's registered voice information from the user information DB 2130 based on the speaker's identifier and transmits the extracted speaker's registered voice information to a voice extraction unit 2222 of the analysis module 2220.

The voice extraction unit 2222 extracts the individual voice information of the speaker from the voice information received by the input module 2210. The voice extraction unit 2222 may extract the individual voice information of the speaker from the voice information (voice information input to the terminal 2210) received by the input module 2210 based on the registered voice information of the speaker. As another example, the voice extraction unit 2222 may extract the individual the voice information of the speaker from the voice information (voice information input to the terminal 2210) received by the input module 2210 based on the image information of the speaker. The voice extraction unit 2222 may extract the individual voice information of the speaker by utilizing both the registered voice information of the speaker and the image information of the speaker.

When the interpretation module 2120 uses the end-to-end interpretation engine, the voice extraction unit 2222 transmits the individual voice information of the speaker to the interpretation module 2120.

The voice extraction unit 2222 detects the speech section from the individual voice information of the speaker. That is, the voice extraction unit 2222 generates speech section voice information from the individual voice information of the speaker. The voice extraction unit 2222 may increase the reliability of detection of the start and end points of the speech by utilizing the individual image information of the speaker. The voice extraction unit 2222 transmits the speech section voice information of each speaker to the interpretation module 2120.

When the analysis module 2220 further includes a situation determination unit 2223 and a word extraction unit 2224, the analysis module 2220 may transmit the subject/situation-related information generated by the situation determination unit 2223 and the word extraction unit 2224 to the interpretation module 2120. The information related to the subject or situation may be at least one of a subject, a situation, an embedding vector related to the subject, an embedding vector related to the situation, a word/phrase related to the subject, and a word/phrase related to the situation.

The interpretation module 2120 may transmit the interpretation result generated based on the voice information to be interpreted to the output module 2230 of the terminal 2200, and store the interpretation result in the conversation history DB 2140.

The output module 2230 of the terminal 2200 transmits the interpretation result to the user through a display 2232 or a sound output unit 2234.

Figure 11:
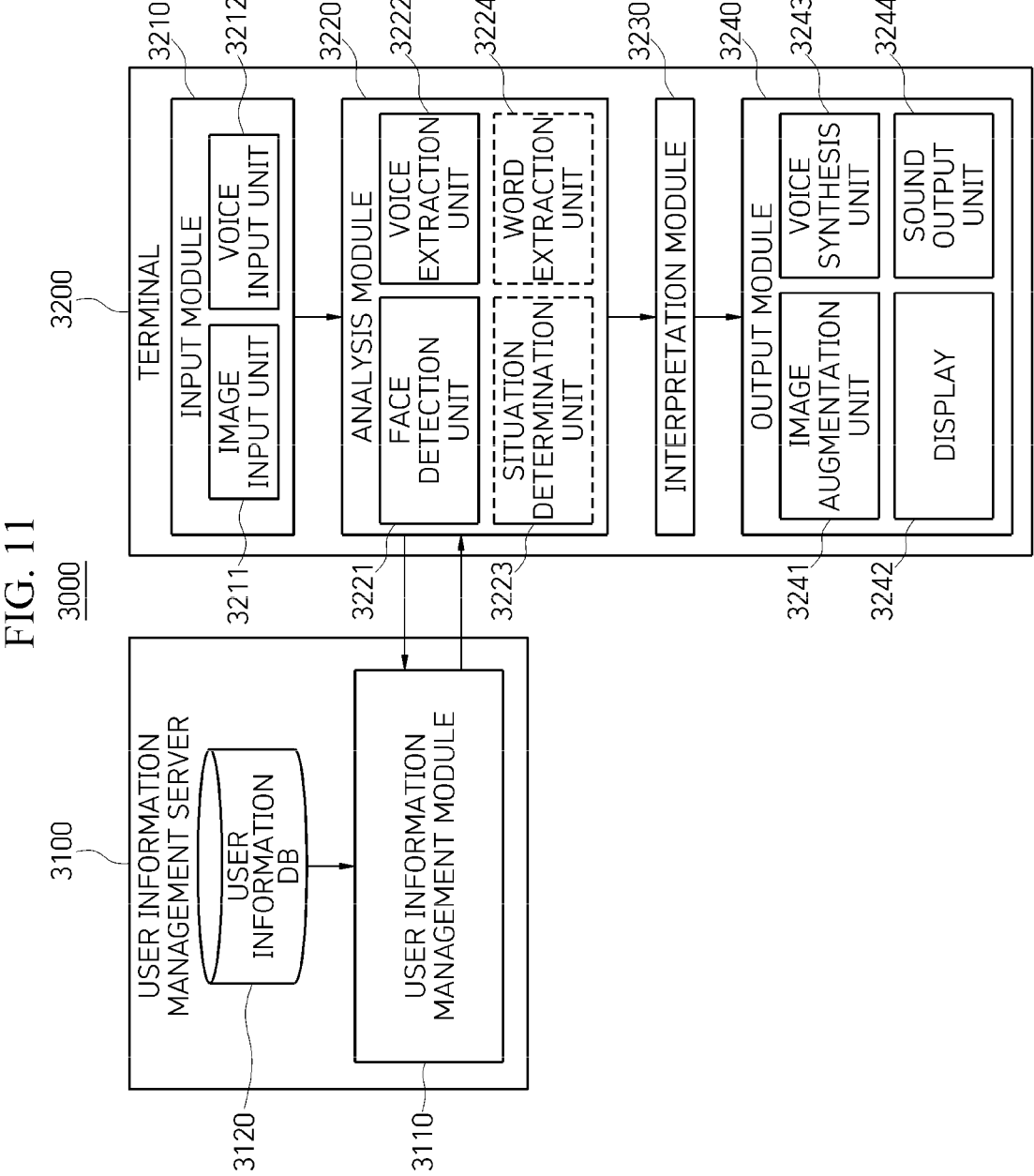
FIG. 11 is a block diagram illustrating a configuration of a gaze-based and augmented automatic interpretation system according to a third embodiment of the present invention.

FIG. 11 is a block diagram illustrating a configuration of a gaze-based and augmented automatic interpretation system according to a third embodiment of the present invention.

A gaze-based and augmented automatic interpretation system 3000 according to a third embodiment of the present invention is configured to include a user information management server 3100 and a terminal 3200.

Compared to the second embodiment, according to the third embodiment, an interpretation module 3230 is further included in the terminal 3200. In the third embodiment, since the terminal 3200 performs an operation of detecting a speaker's face, an operation of extracting individual voice information of a speaker, an operation of extracting speech section voice information of each speaker, and an interpretation operation, it may be implemented when the processing performance of the processor built into the terminal 3200 is very excellent.

The basic function of each module is the same as that of the first embodiment and the second embodiment. That is, a user information management module 3110 has the same function as the user information management modules 1120 and 2110, an interpretation module 3220 has the same function as the input modules 1210 and 2210, an analysis module 3220 has the same function as the analysis modules 1110 and 2220, the interpretation module 3230 has the same function as the interpretation modules 1130 and 2120, and the output module 2230 has the same function as the output modules 1220 and 2230.

In the third embodiment, the communication between the user information management server 3100 and the terminal 3200 is performed by the process in which the analysis module 3220 transmits the detected face information of the speaker to the user information management module 3110, and the user information management module 3110 transmits the registered voice information of the speaker extracted from the user information DB 3120 to the analysis module 3220.

Figure 12:
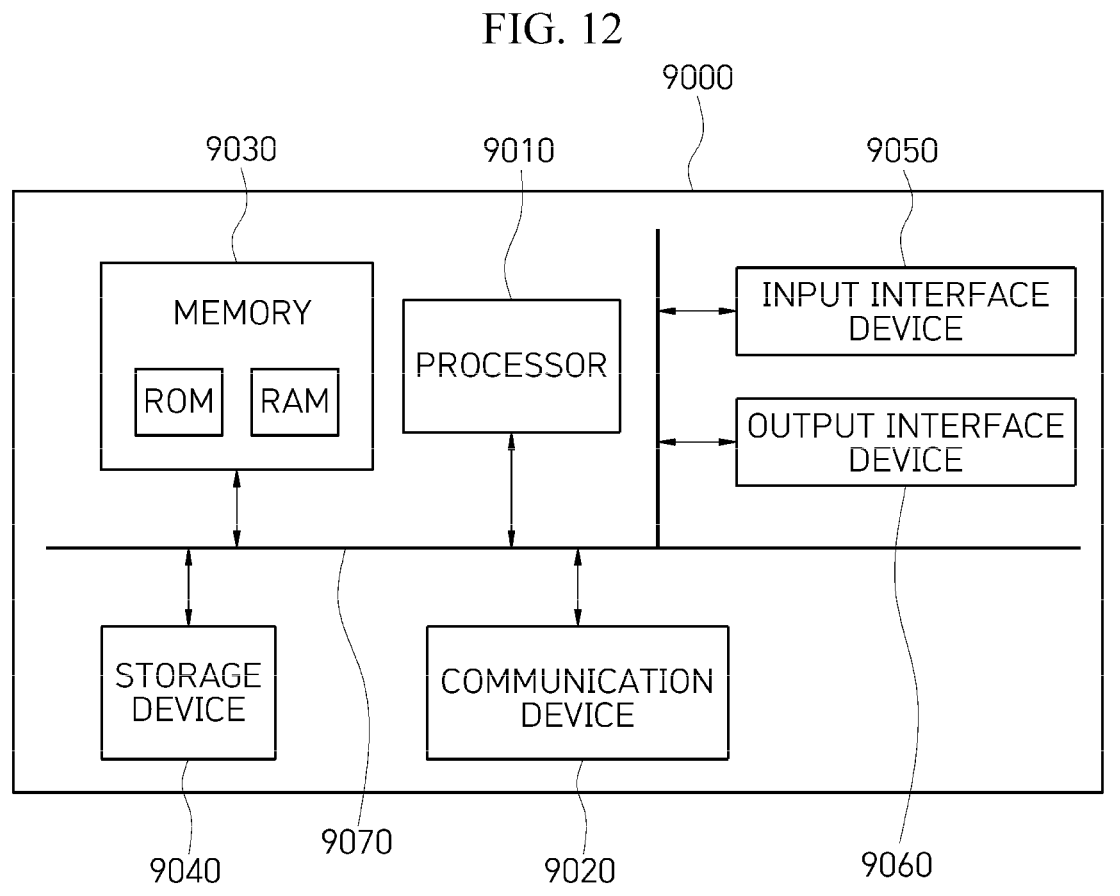

FIG. 12 is a block diagram illustrating a computer system for implementing the method according to the embodiment of the present invention.

Referring to FIG. 12, a computer system 9000 may include at least one of a processor 9010, a memory 9030, an input interface device 9050, an output interface device 9060, and a storage device 9040 which communicate via a bus 9070. The computer system 9000 may further include a communication device 9020 coupled to a network. The processor 9010 may be a central processing unit (CPU) or a semiconductor device that executes instructions stored in the memory 9030 or the storage device 9040. The memory 9030 and the storage device 9040 may include various types of volatile or non-volatile storage media. For example, the memory may include a read only memory (ROM) and a random-access memory (RAM). In the embodiment of the present invention, the memory may be positioned inside or outside the processor, and the memory may be connected to the processor through various known units. The memory may include various types of volatile or non-volatile storage media. For example, the memory may include a ROM or a RAM.

Therefore, the embodiment of the present invention may be implemented as a method implemented in a computer or as a non-transitory computer-readable medium having computer-executable instructions stored therein. In an embodiment, when the computer-executable instructions are executed by the processor, the computer-executable instructions may perform the method according to at least one aspect of the present invention.

The communication device 9020 may transmit or receive a wired signal or a wireless signal.

Further, the method according to the embodiment of the present invention may be implemented in the form of program instructions that can be executed through various computer units and recorded on computer readable media.

The computer readable media may include program instructions, data files, data structures, or combinations thereof. The program instructions recorded on the computer readable media may be specially designed and prepared for the embodiments of the invention or may be available well-known instructions for those skilled in the field of computer software. The computer readable media may include a hardware device configured to store and execute program instructions. Examples of the computer readable media include magnetic media such as a hard disk, a floppy disk, and a magnetic tape, optical media such as a compact disc read only memory (CD-ROM) and a digital videodisc (DVD), magneto-optical media such as a floptical disk, and a hardware device, such as a ROM, a RAM, or a flash memory, that is specially made to store and perform the program instructions. Examples of the program instruction include machine code generated by a compiler and high-level language code that can be executed in a computer using an interpreter and the like.

While embodiments of the present invention have been described above in detail, the scope of the present invention is not limited thereto, but encompasses several modifications and improvements by those skilled in the art using basic concepts of embodiments of the present invention defined by the appended claims.

For reference, the components according to the embodiment of the present invention may be implemented in the form of software or hardware such as a digital signal processor (DSP), a field programmable gate array (FPGA), or an application specific integrated circuit (ASIC), and perform predetermined roles.

However, "components" are not limited to software or hardware, and each component may be configured to be in an addressable storage medium or to reproduce one or more processors.

Accordingly, for example, the component includes components such as software components, object-oriented software components, class components, and task components, processors, functions, attributes, procedures, subroutines, segments of a program code, drivers, firmware, a microcode, a circuit, data, a database, data structures, tables, arrays, and variables.

Components and functions provided within the components may be combined into a smaller number of components or further divided into additional components.

Meanwhile, it will be appreciated that each block of a processing flowchart and combinations of the flowcharts may be executed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in a block (s) of the flowchart. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in a block(s) of the flowchart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously illustrated may be simultaneously performed in fact or be performed in a reverse sequence depending on corresponding functions.

The term "~unit" or "~module" used in the specification refers to a software component or a hardware component such as FPGA or ASIC, and the "~unit" or "~module" performs certain roles. However, the "~unit" or "~module" is not meant to be limited to software or hardware. The "~unit" or "~module" may be configured to be stored in a storage medium that can be addressed or may be configured to regenerate one or more processors. Accordingly, as an example, the "~unit" or "~module" refers to components such as software components, object-oriented software components, class components, and task components, processes, functions, attributes, procedures, subroutines, segments of program code, drivers, firmware, microcode, circuits, data, databases, data structures, tables, arrays and variables. Functions provided in components, and the "~unit" or "~modules" may be combined into fewer components, and "~unit" or "~modules" or further separated into additional components, and "~unit" or "~modules." In addition, components and "~or/er" or "~modules" may be implemented to play one or more CPUs in a device or a secure multimedia card.

According to the present invention, unlike the voice-based automatic interpretation method which is the conventional method, it is possible for a user to conveniently acquire information by converting all voices of multiple speakers around the user into his/her native language.

In addition, according to the present invention, by fusing with the conventional face-to-face method, it is possible to provide both a two-way conversation mode when a plurality of users wear smart devices (smartphones, smart glasses) and a listening mode when a single user wears a smart device.

In addition, according to the present invention, since an original sound may be robustly separated in a speech over-lapping section, it is possible to effectively support user's travel by naturally interpreting and augmenting multilingual voice into user's native language.

Effects which can be achieved by the present invention are not limited to the above-described effects. That is, other objects that are not described may be obviously understood by those skilled in the art to which the present invention pertains from the following description.

Although exemplary embodiments of the present invention have been disclosed above, it may be understood by those skilled in the art that the present invention may be variously modified and changed without departing from the scope and spirit of the present invention described in the following claims.

What is claimed is:

1. A gaze-based and augmented automatic interpretation method, comprising:

collecting image information and voice information within a user's visual field, and detecting a face region of a speaker from the collected image information;

selecting at least one speaker to be interpreted based on the detected face region and individually extracting voice information of the speaker from the collected voice information;

inferring a situation based on the collected image information;

extracting words related to the situation, from a situation-word database and from text information which is recognized in the collected image information; and generating an interpretation result according to a predetermined target language based on the voice information of the speaker, wherein, in the inferring the situation based on the collected image information, an interpretation server or a terminal extracts features of text, objects, distribution of multiple objects, features of the user's surrounding environment, and color from the collected image information, and inputs the features to a pre-trained deep learning model to determine the situation based on the features, and wherein, in the generating of the interpretation result, the interpretation result is generated according to the target language based on the words related to the situation and the voice information of the speaker.

2. The gaze-based and augmented automatic interpretation method of claim 1, further comprising:

adding the interpretation result to the collected image information and displaying the collected image information on a screen of a terminal of the user, wherein, in the displaying on the terminal screen, a position to which the interpretation result is added on the collected image information is determined based on the detected face region.

3. The gaze-based and augmented automatic interpretation method of claim 1, further comprising:

detecting a speech section from the voice information of the speaker to extract voice information of a speech section of the speaker, wherein, in the generating of the interpretation result, the interpretation result is generated by using a speech recognition model and a machine translation model based on the voice information of the speech section.

4. The gaze-based and augmented automatic interpretation method of claim 3, wherein the extracting of the voice information of the speaker further includes extracting the image information of the speaker from the collected image information based on the detected face region, and in the extracting of the voice information of the speech section, the voice information of the speech section of the speaker is extracted by detecting the speech section from the voice information of the speaker based on the image information of the speaker.

5. The gaze-based and augmented automatic interpretation method of claim 1, wherein the extracting of the voice information of the speaker further includes extracting image information of the speaker from the collected image information based on the detected face region, and in the generating of the interpretation result, the interpretation result is generated based on the voice information of the speaker and the image information of the speaker.

6. The gaze-based and augmented automatic interpretation method of claim 1, wherein, in the extracting of the voice information of the speaker, registered voice information of the speaker is extracted from a user information database based on image information corresponding to the detected face region, and the voice information of the speaker is extracted from the collected voice information by utilizing the registered voice information.

7. The gaze-based and augmented automatic interpretation method of claim 1, wherein the inferring of the situation further includes extracting a word related to the situation from a situation-word database based on the situation, and in the generating of the interpretation result, the interpretation result is generated according to the target language based on a word related to the situation and the voice information of the speaker.

8. The gaze-based and augmented automatic interpretation method of claim 1, further comprising:

recognizing text included in the collected image information, wherein, in the generating of the interpretation result, the interpretation result is generated according to the target language based on the text and the voice information of the speaker.

9. An interpretation server, comprising:

an analysis module that receives image information and voice information in a user's visual field from a user terminal, selects at least one speaker to be interpreted based on a face region detected in the received image information, and individually extracts the voice information of the speaker from the received voice information; and an interpretation module that generates an interpretation result according to a preset target language based on the voice information of the speaker and transmits the generated interpretation result to the terminal, wherein the analysis module extracts features of text, objects, distribution of multiple objects, features of the user's surrounding environment, and color from the received image information, and inputs the features to a pre-trained deep learning model to determine the situation based on the features, wherein the analysis module extracts words related to the situation, from a situation-word database and from text information which is recognized in the collected image information, and wherein the interpretation module generates the interpretation result according to the preset target language based on the words related to the situation and the voice information of the speaker.

10. The interpretation server of claim 9, further comprising:

a user information management module that extracts registered voice information of the speaker to be interpreted from a user information database based on an image corresponding to the face region detected in the received image information, wherein the analysis module individually extracts the voice information of the speaker based on the received voice information and the registered voice information.

11. The interpretation server of claim 9, further comprising:

a user information management module that extracts registered voice information of the speaker to be interpreted from a user information database based on an image corresponding to the face region detected in the received image information, wherein the interpretation module generates a synthesized sound matching a tone of the speaker based on the registered voice information and the interpretation result, and transmits the generated synthesized sound to the terminal.

12. The interpretation server of claim 9, wherein the analysis module detects a speech section from the voice information of the speaker and extracts speech section voice information of the speaker, and the interpretation module generates the interpretation result by using a speech recognition model and a machine translation model based on the speech section voice information.

13. The interpretation server of claim 9, wherein the analysis module extracts the image information of speaker from the received image information based on the detected face region, and the interpretation module generates the interpretation result based on the voice information of the speaker and the image information of the speaker.

14. A terminal, comprising:

an input module that collects image information and voice information of a user's visual field;

an analysis module that detects a face region of a speaker in the collected image information, selects at least one speaker to be interpreted based on the detected face region, and individually extracts the voice information of the speaker from the collected voice information and transmits the extracted voice information to an interpretation server; and an output module that receives an interpretation result for the voice information of the speaker from the interpretation server and outputs the interpretation result through at least one of a display and a speaker, wherein the analysis module infers a situation based on the collected image information, and transmits the inferred situation to the interpretation server, wherein the analysis module extracts features of text, objects, distribution of multiple objects, features of the user's surrounding environment, and color from the collected image information, and inputs the features to a pre-trained deep learning model to determine the situation based on the features, wherein the analysis module extracts words related to the situation, from a situation-word database and from text information which is recognized in the collected image information, and wherein the interpretation server generates the interpretation result according to a preset target language based on the words related to the situation and the voice information of the speaker.

15. The terminal of claim 14, wherein the terminal is a smart glass worn by a user.

16. The terminal of claim 14, wherein the analysis module extracts the image information of speaker from the collected image information based on the detected face region and transmits the extracted image information to the interpretation server.

17. The terminal of claim 14, wherein the analysis module transmits the image of the face region detected in the collected image information to the interpretation server, receives registered voice information of a speaker matching the image of the detected face region from the interpretation server, and uses the registered voice information to extract the voice information of the speaker from the collected voice information.

* * * * *